(12) United States Patent
Chen et al.

(10) Patent No.: US 12,598,641 B2
(45) Date of Patent: Apr. 7, 2026

(54) CHANNEL ACCESS BASED ON MODE OF OPERATION

(71) Applicant: QUALCOMM Incorporated, San Diego, CA (US)

(72) Inventors: Siyi Chen, Beijing (CN); Arumugam Chendamarai Kannan, San Diego, CA (US); Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/263,038

(22) PCT Filed: Mar. 26, 2021

(86) PCT No.: PCT/CN2021/083189
§ 371 (c)(1),
(2) Date: Jul. 26, 2023

(87) PCT Pub. No.: WO2022/198621
PCT Pub. Date: Sep. 29, 2022

(65) Prior Publication Data
US 2024/0090020 A1      Mar. 14, 2024

(51) Int. Cl.
*H04W 74/0808* (2024.01)

(52) U.S. Cl.
CPC .............................. *H04W 74/0808* (2013.01)

(58) Field of Classification Search
CPC ........................ H04W 74/0808; H04W 74/00
See application file for complete search history.

(56) References Cited

U.S. PATENT DOCUMENTS

| | | | |
|---|---|---|---|
| 10,264,541 B2 | 4/2019 | Patel et al. | |
| 10,736,125 B2 | 8/2020 | Sadek | |
| 2012/0275362 A1 | 11/2012 | Park et al. | |
| 2017/0111099 A1* | 4/2017 | Jo ........................ | H04B 7/0684 |
| 2018/0006791 A1* | 1/2018 | Marinier ........... | H04W 52/0216 |
| 2019/0215217 A1* | 7/2019 | Kim ..................... | H04L 5/0048 |

(Continued)

FOREIGN PATENT DOCUMENTS

| | | |
|---|---|---|
| EP | 3648386 A1 | 5/2020 |
| WO | 2017136434 | 8/2017 |

(Continued)

OTHER PUBLICATIONS

International Search Report and Written Opinion—PCT/CN2021/083189—ISA/EPO—Dec. 30, 2021.

(Continued)

*Primary Examiner* — Siren Wei
(74) *Attorney, Agent, or Firm* — Dinsmore & Shohl LLP

(57) ABSTRACT

Certain aspects of the present disclosure provide techniques for channel access. One example method by a wireless node generally includes selecting a mode of operation associated with a configuration for communicating with one or more other wireless nodes, determining a procedure for gaining access to a medium to be used for the communication, wherein the procedure is determined based on the mode of operation, and communicating with the one or more other wireless nodes using the mode of operation after gaining access to the medium based on the procedure.

22 Claims, 11 Drawing Sheets

(56)                References Cited

U.S. PATENT DOCUMENTS

| 2020/0053798 A1* | 2/2020 | Tsai .................... H04W 74/006 |
|---|---|---|
| 2020/0120544 A1* | 4/2020 | Liu ....................... H04W 28/26 |
| 2021/0153245 A1* | 5/2021 | Tooher ............. H04W 72/0453 |
| 2022/0124799 A1* | 4/2022 | Hu ........................ H04W 24/08 |
| 2023/0397015 A1* | 12/2023 | Liu .................. H04W 72/1268 |

FOREIGN PATENT DOCUMENTS

| WO | 2017193071 | 11/2017 |
|---|---|---|
| WO | 2019195465 A1 | 10/2019 |

OTHER PUBLICATIONS

Supplementary European Search Report—EP21932246—Search Authority—The Hague—Nov. 14, 2024.

* cited by examiner

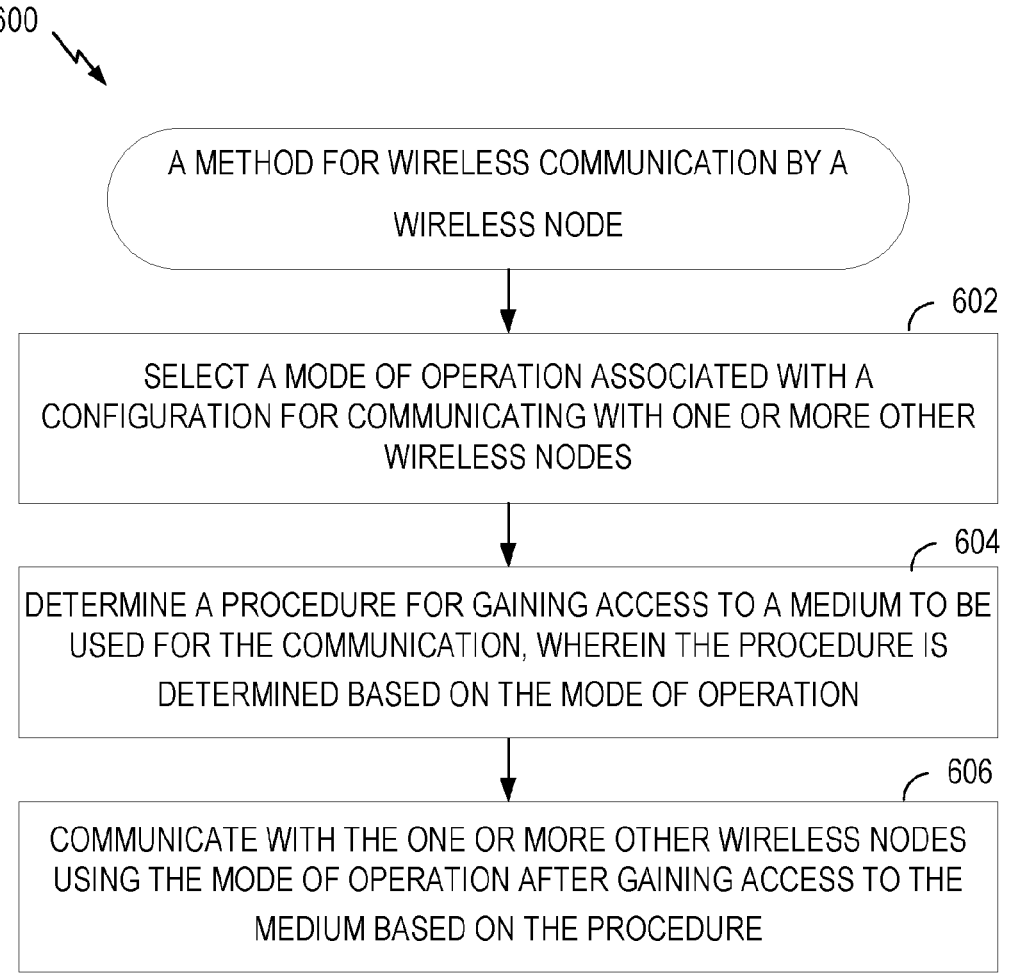

600

A METHOD FOR WIRELESS COMMUNICATION BY A WIRELESS NODE

602

SELECT A MODE OF OPERATION ASSOCIATED WITH A CONFIGURATION FOR COMMUNICATING WITH ONE OR MORE OTHER WIRELESS NODES

604

DETERMINE A PROCEDURE FOR GAINING ACCESS TO A MEDIUM TO BE USED FOR THE COMMUNICATION, WHEREIN THE PROCEDURE IS DETERMINED BASED ON THE MODE OF OPERATION

606

COMMUNICATE WITH THE ONE OR MORE OTHER WIRELESS NODES USING THE MODE OF OPERATION AFTER GAINING ACCESS TO THE MEDIUM BASED ON THE PROCEDURE

*FIG. 6*

CHANNEL ACCESS BASED ON MODE OF OPERATION

CROSS-REFERENCE TO RELATED APPLICATION(S)

This application is a national stage application under 35 U.S.C. 371 of PCT/CN2021/083189, filed Mar. 26, 2021, which is hereby expressly incorporated by reference herein in its entirety as if fully set forth below and for all applicable purposes.

INTRODUCTION

Aspects of the present disclosure relate to wireless communications, and more particularly, to techniques for channel access in a wireless communication system.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a wireless node. The method generally includes selecting a mode of operation associated with a configuration for communicating with one or more other wireless nodes, determining a procedure for gaining access to a medium to be used for the communication, wherein the procedure is determined based on the mode of operation, and communicating with the one or more other wireless nodes using the mode of operation after gaining access to the medium based on the procedure.

Another aspects provides an apparatus for wireless communication. The apparatus generally includes: a memory having executable instructions; and one or more processors configured to execute the executable instructions and cause the apparatus to select a mode of operation associated with a configuration for communicating with one or more wireless nodes, determine a procedure for gaining access to a medium to be used for the communication, wherein the procedure is determined based on the mode of operation, and communicate with the one or more wireless nodes using the mode of operation after gaining access to the medium based on the procedure.

Another aspect provides an apparatus for wireless communication. The apparatus generally includes means for selecting a mode of operation associated with a configuration for communicating with one or more wireless nodes, means for determining a procedure for gaining access to a medium to be used for the communication, wherein the procedure is determined based on the mode of operation, and means for communicating with the one or more wireless nodes using the mode of operation after gaining access to the medium based on the procedure.

Another aspect provides a non-transitory computer-readable medium comprising executable instructions that, when executed by one or more processors of an apparatus, cause the apparatus to select a mode of operation associated with a configuration for communicating with one or more wireless nodes, determine a procedure for gaining access to a medium to be used for the communication, wherein the procedure is determined based on the mode of operation, and communicate with the one or more wireless nodes using the mode of operation after gaining access to the medium based on the procedure.

Other aspects provide apparatuses configured to perform the aforementioned methods as well as those described herein; non-transitory, computer-readable media comprising instructions that, when executed by one or more processors of an apparatus, cause the apparatus to perform the aforementioned methods as well as those described herein; a computer program product embodied on a computer readable storage medium comprising code for performing the aforementioned methods as well as those further described herein; and an apparatus comprising means for performing the aforementioned methods as well as those further described herein.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 6 is a flow diagram illustrating example operations for wireless communication.

3
DETAILED DESCRIPTION

Aspects of the present disclosure provide apparatuses, methods, processing systems, and computer-readable mediums for accessing channels in a wireless communication system. Various channel access procedures have been designed to allow nodes to access a wireless medium to reduce interference with other nodes vying for access to the same medium. For example, a node may measure energy on the medium to estimate whether another node is nearby and access the channel accordingly.

There are multiple channel access procedures available having different stringencies. Channel access procedures that are more stringent may result in reduced communication efficiency (e.g., higher latency), but also reduce the possible interference between nodes. In some aspects of the present disclosure, a channel access procedure for communication may be selected based on a communication configuration. For example, communications with higher priority (e.g., a communication on a primary cell) may be allowed to select a less stringent channel access procedure than lower priority communications (e.g., a communication on a secondary cell). As another example, communication configurations that are less likely to cause interference with other nodes, such as a single-transmission-reception point (TRP) transmission, may select a less stringent channel access procedure than communication configurations are more likely to cause interference, such as multi-TRP transmissions. The aspects of the present disclosure allow for higher efficiency communication for specific communication configurations while mitigating interference with other nodes.

Introduction to Wireless Communication Networks

Figure 1:
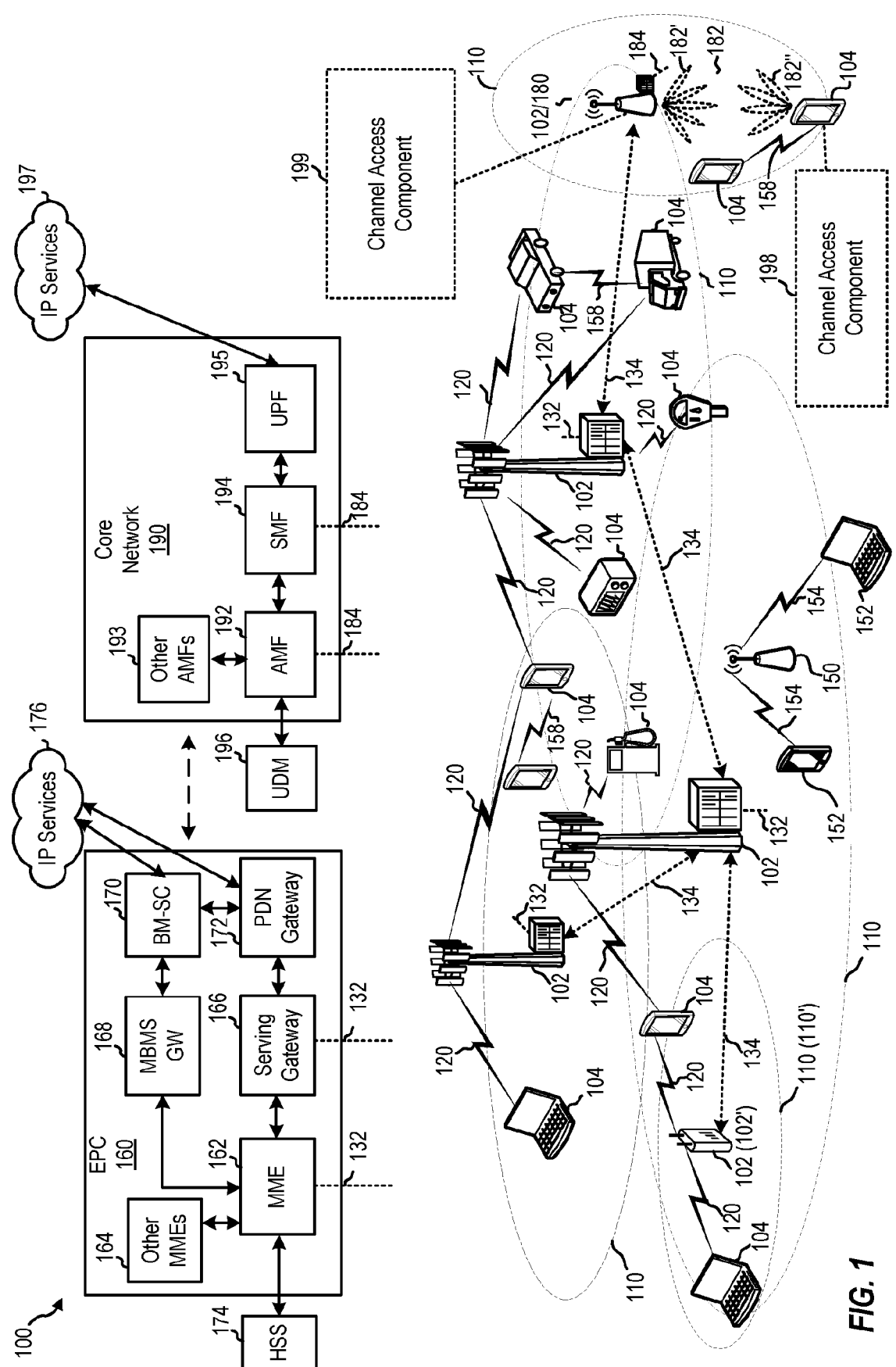
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes channel access component 199, which may be configured to select a channel access procedure for communicating with the UE 104. Wireless network 100 further includes channel access component 198, which may be used configured to select a channel access procedure for communicating with the BS 102.

Figure 2:
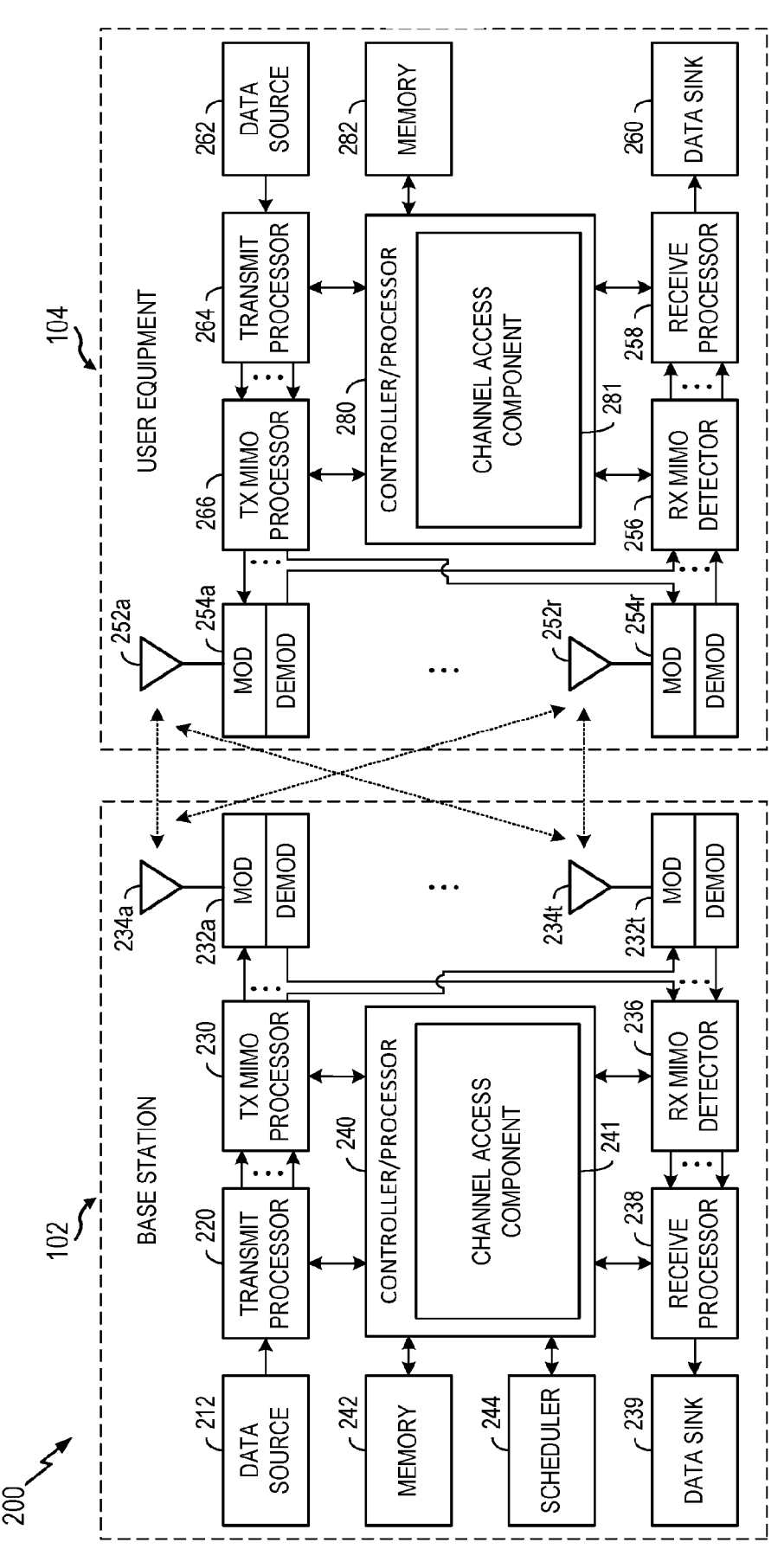
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a channel access component 241, which may be representative of channel access component 199 of FIG. 1. Notably, while depicted as an aspect of controller/processor 240, channel access component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260). User equipment 102 includes controller/processor 280, which may be configured to implement various functions related to wireless communications.

User equipment 102 includes controller/processor 280, which may be configured to implement various functions related to wireless communications. In the depicted example, controller/processor 280 includes channel access component 281, which may be representative of channel access component 198 of FIG. 1. Notably, while depicted as an aspect of controller/processor 280, channel access component 281 may be implemented additionally or alternatively in various other aspects of user equipment 104 in other implementations.

Figure 3:
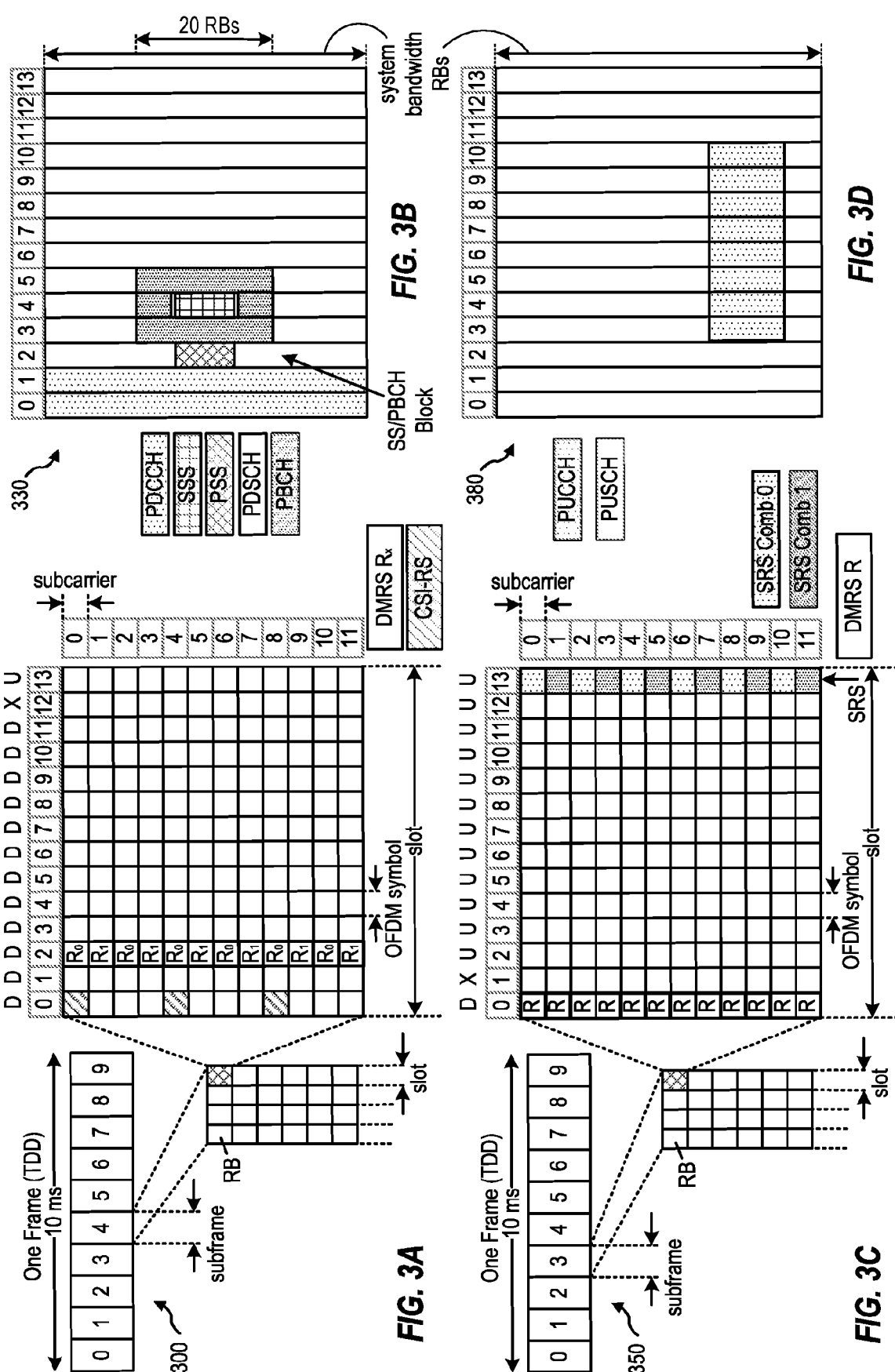
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Listen-Before-Talk (LBT) Protocol

Listen-before-talk (LBT) is a spectrum sharing mechanism by which a device senses a medium for a channel using a clear channel assessment (CCA) check before gaining access to the channel. LBT works across different radio access technologies (RATs), and is adopted by licensed-assisted access (LAA), MulteFire, Wi-Fi, and WiGig to comply with regulations (e.g., known as Carrier Sense Multiple Access with Collision Avoidance (CSMA/CA) in the IEEE 802.11 context). There are various LBT procedures such as category-4 (CAT-4) LBT, CAT-2 LBT, and CAT 1 LBT.

Figure 4:
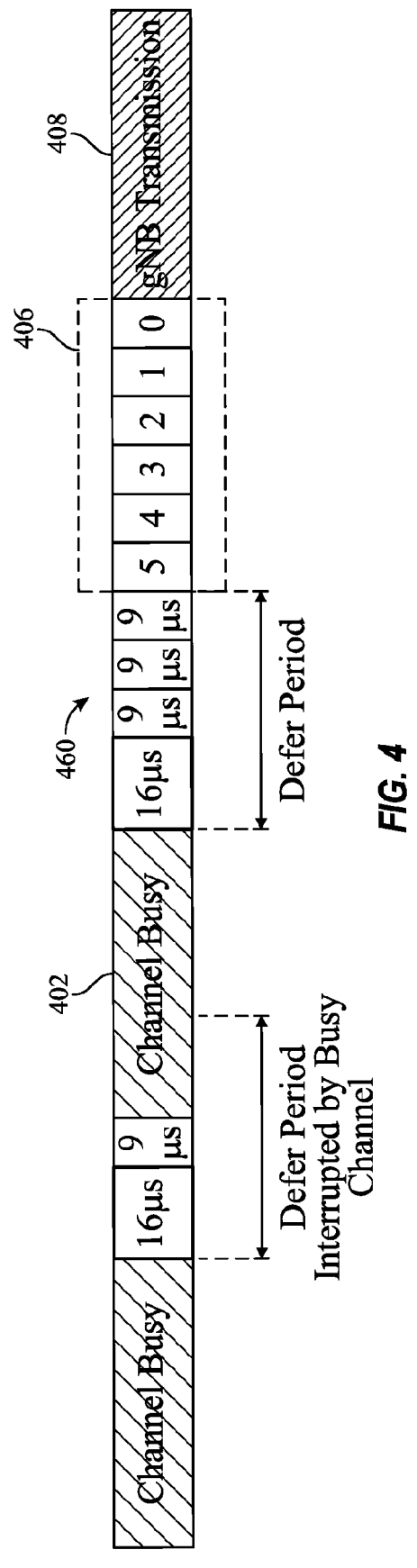
FIG. 4 illustrates a protocol for a category-4 listen-before-talk procedure.

FIG. 4 illustrates a contention window (CW) for a CAT-4 LBT procedure, in some aspects. As illustrated, after a channel busy period 402, a transmitter may begin a defer period during which the transmitter defers any transmission. The defer period may include a defer duration of 16 μs, plus one or more defer time intervals (Td) 460, as illustrated in FIG. 4. For example, a quantity of n defer time intervals (Td) may be implemented, n being related to a channel access priority class (CAPC) of the transmitter, and the typical value for Td may be 9 μs. After the defer duration (16 μs and n Td), CW 406 begins. The CW 406 may have a duration of Nx Td, N being a randomly selected integer uniformly distributed between 0 and a contention window size (CWS). As illustrated, a transmission 408 may occur after the CW 406. Other LBT procedures may include different defer periods. Lower defer periods result in less latency, but may be less effective for reduction of interference to other nodes. As examples, a type 2A CAT 2 LBT procedure may have either a 25 μs defer period, a type 2B CAT 2 LBT procedure may have a 16 μs defer period, and a CAT 1 LBT procedure may have a gap of up to 16 μs.

Figures 5A, 5B:
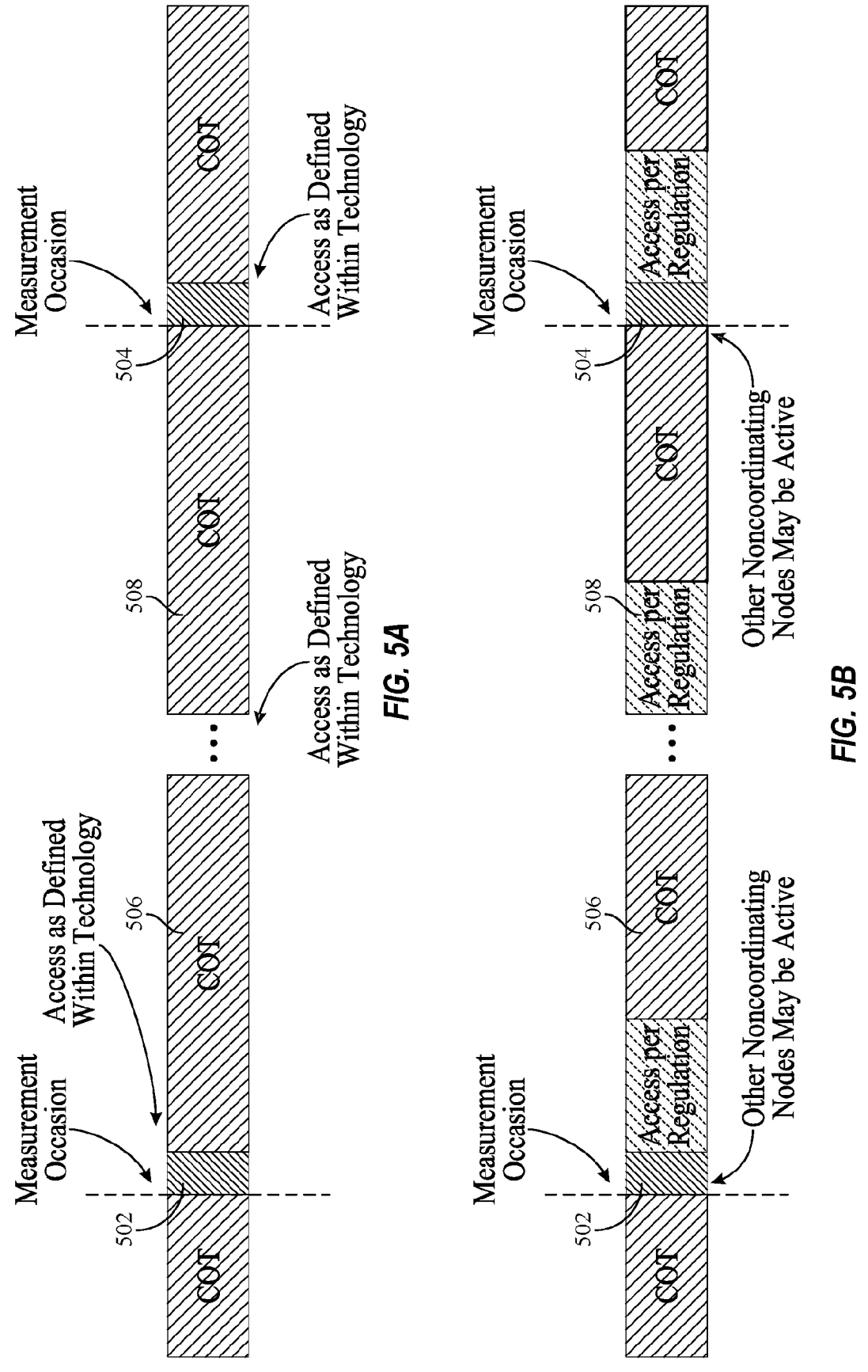
FIGS. 5A and 5B illustrates a long-term sensing mechanism.

FIG. 5A illustrates a long-term sensing mechanism. Long-term sensing is a procedure used to improve coexistence of nodes by sensing the channel over a smaller timescale than individual bursts of transmissions. If a transmitter does not sense a nearby node during the sensing period for long-term sensing, the transmitter may use multiple channel occupancy times (COTs) for transmission. Long-term sensing involves periodic channel measurements per selected channel. Channel measurement may be performed during measurement occasions 502 and 504, for example. If no nearby node is detected, no additional restriction on medium access may be imposed by regulation, allowing the wireless node to transmit during multiple channel occupancy times (COTs). For example, if no nearby node is detected by channel sensing during measurement occasion 502, the wireless node may communicate on the channel during multiple COTs 506 and 508, as illustrated in FIG. 5A. During the measurement occasions, other coordinating nodes may be silent and perform measurements in order to avoid interfering with each other. If a nearby node is detected, additional restriction on medium access may be imposed, such as constraints on transmission or a requirement to perform an LBT procedure prior to each of the COTs, as shown in FIG. 5B.

Aspects Related to Channel Access Based on Mode of Operation

LBT was adopted for communication on an unlicensed band to guarantee fair coexistence among different radio access technologies. However, higher transmit (TX) and receive (RX) directionality generally reduce the necessity of LBT in higher frequency bands that use beamforming. Meanwhile, LBT has some influence on the timeline of new radio (NR) procedures, which may increase latency or have complicated procedures which introduce losses (e.g., power loss). Some aspects of the present disclosure are directed to using simpler channel access rules for configurations (e.g., cells) that rely on an unlicensed carrier for important procedures.

Certain aspects of the present disclosure provide techniques for reducing the LBT influence on important procedures. For example, a channel access procedure may be selected based on a mode of operation in some aspects. A wireless node may access the channel without LBT or long-term sensing for cells that rely on an unlicensed carrier for important procedures such as communication for standalone (SA) mode of operation where the primary cell (PCell) is in an unlicensed band. Channel access (e.g., LBT) may be a function of whether the corresponding communication is on a primary cell (Pcell) or a secondary cell (Scell). In some aspects, channel access (e.g., LBT) may be a function of whether a single-transmission-reception point (TRP) or multiple TRPs are used for communication with a UE.

FIG. 6 is a flow diagram illustrating example operations 600 for wireless communication. The operations 600 may be performed by a wireless node (e.g., BS 102 or UE 104 in the wireless communication network 100). The operations 600 may be implemented as software components that are executed and run on one or more processors (e.g., controller/processor 240 or 280 of FIG. 2). Further, the transmission and reception of signals by the BS or the UE in operations 600 may be enabled, for example, by one or more antennas (e.g., antennas 234 or 252 of FIG. 2). In certain aspects, the transmission and/or reception of signals by the BS of the UE may be implemented via a bus interface of one or more processors (e.g., controller/processor 240 or 280) obtaining and/or outputting signals.

Operations 600 begin, at block 602, by the wireless node selecting a mode of operation associated with a configuration for communicating with one or more other wireless nodes. For example, selecting the mode of operation may include selecting a cell (e.g., selecting between a PCell and a Scell, or between a primary secondary cell (PSCell) and a SCell) associated with the communication. In some aspects, selecting the mode of operation may include selecting whether the communication uses a single-TRP or multi-TRP communication with a user-equipment (UE).

At block 604, the wireless node may determine a procedure for gaining access to a medium to be used for the communication, where the procedure is determined based on the mode of operation. For example, determining the procedure for gaining access to the medium may include determining whether to perform a LBT procedure. In some cases, determining the procedure may include selecting between a LBT procedure and a long-term sensing procedure.

At block 606, the wireless node may communicate with the one or more other wireless nodes using the mode of operation after gaining access to the medium based on the procedure.

As described, channel access may be based on a cell (e.g., when multiple carriers are configured). For example, channel access (e.g., LBT) may be a function of whether a communication is on a PCell or SCell. For carrier aggregation mode, a BS may have one Pcell and multiple SCells. Different channel access rules may be applied for the PCell and the SCells. For example, accessing the channel for communication on an SCell may be based on a more stringent channel access procedure (e.g., as compared to channel access for a PCell) to keep overall inter-cell interference low. Channel access for communication on a PCell may follow a simpler (e.g., less stringent) channel access procedure.

Some aspects of the present disclosure are directed to applying channel access procedures having different stringencies. For example, CAT 4 LBT may be a more stringent channel access procedure than CAT 3 LBT, CAT 3 LBT may be more stringent than CAT 2 LBT, CAT 2 LBT may be more stringent than long-term sensing. The least stringent channel access procedure may involve not performing any channel sensing procedure to access the channel. As used herein, an a channel sensing procedure generally refers to any channel access procedure that involves channel sensing prior to communication, such as long term sensing or any of the LBT procedures.

Example Channel Access Based on Cell

PCells across different BSs may be deployed on different frequencies to reduce PCell to PCell interference. For NR-unlicensed (U) standalone (SA) mode, various channel access options may be used. As an example, a wireless node may not perform a channel sensing procedure for communication on the PCell, and perform a channel sensing procedure for communication on the SCells. As another example, the wireless node may not perform a channel sensing procedure for communication on PCell, but perform long-term sensing for communication on SCells. As another example, the wireless node may perform long-term sensing for communication on the PCell, and perform an LBT procedure for communication on SCells. As another example, the wireless node may perform CAT 2 LBT for communication on PCell, whereas CAT4 LBT may be performed for communication on SCells.

For NR-U non-SA (NSA) mode, the PCell may be on a licensed band. Thus, a channel sensing procedure may not be performed for channel access for the PCell on the licensed band, but rather, implemented for when communication for the PCell is configured on an unlicensed band. However, for communication on SCells, the wireless node may perform a channel sensing procedure (e.g., perform long-term sensing).

Some aspects of the present disclosure are directed channel access procedures based on a cell associated with dual connectivity (DC). Similar to carrier aggregation (CA), DC aims to use the radio resource within multiple carriers to improve UE throughput. For example, a master cell group (MCG) may be used or a secondary cell group (SCG) may be used. MCG is a group of serving cells associated with a master BS (e.g., master eNB (MeNB)), including a PCell and optionally one or more SCells. SCG is a group of serving cells associated with a secondary BS (e.g., secondary eNB (SeNB)), including a secondary PCell (SPCell) and optionally one or more SCells.

For MCG, communication on PCell may use a less stringent channel access procedure (e.g., no channel sensing procedure may be performed, or long-term sensing may be performed), whereas communication on the SCell may involve performing a relatively more stringent channel access procedure (e.g., long-term sensing or CAT 2/3/4 LBT). For SCG, a wireless node may communicate on the PSCell by using a less stringent channel access procedure. For example, the wireless node may not perform an channel sensing procedure or perform long-term sensing, whereas for communicating on the SCell, the wireless node may perform a relatively more stringent channel access procedure (e.g., long-term sensing or CAT2/3/4 LBT).

In some aspects, the selection of the mode of operation (e.g., at block 602 of FIG. 6) may include selecting a cell associated with the communication, where the procedure for gaining access is determined based on the cell. For MCG, selecting the cell associated with the communication may include selecting one of a primary cell and a secondary cell. For SCG, selecting the cell associated with the communication may include selecting one of a primary secondary cell and a secondary cell. Selection of a procedure for gaining access to a medium based on a cell is described in more detail with respect to FIG. 7.

Figure 7:
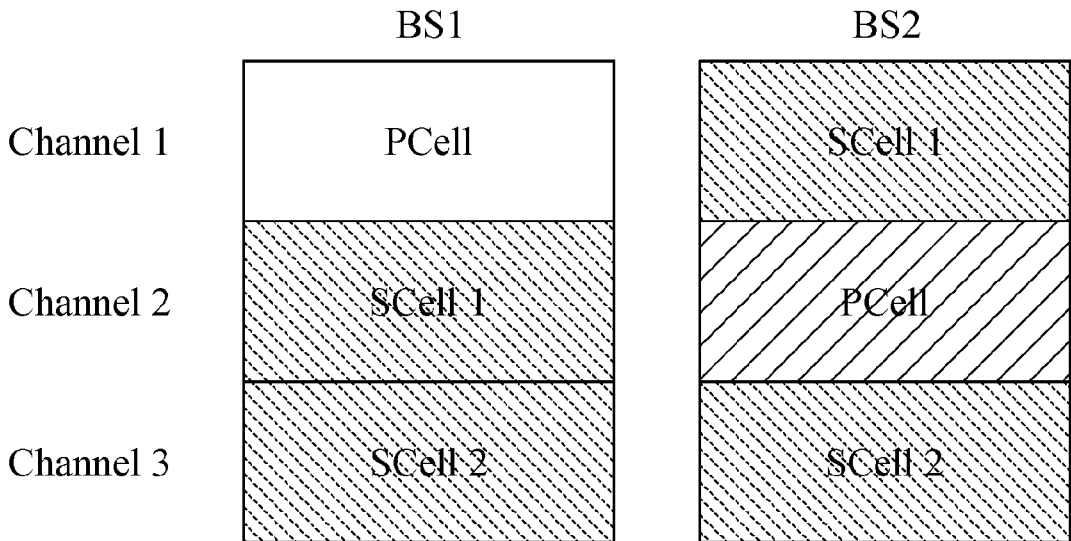
FIG. 7 illustrates an example selection of channel access procedures as a function of a cell.

FIG. 7 illustrates an example selection of channel access procedures as a function of a cell (e.g., PCell or SCell). Channels for communication by BS1 and BS2 may be configured such that communication on PCell by BS1 does not interfere with communication on PCell by BS2. For instance, BS1 may use channel 1 for communication on the PCell, while BS2 may use channel 2 for communication on the PCell, as illustrated. In carrier 1 (e.g., channel 1), BS2 communicating on SCell 1 may back off if BS1 is transmitting on the PCell. For example, as described herein, a more stringent channel access procedure may be used to communicate on SCell 1 as compared to the PCell. Similarly, for carrier 2 (e.g., channel 2), BS1 communicating on SCell 1 may back off if BS2 communicates on the PCell. BS1 and BS2 may use the same channel (e.g., channel 3) for communication on SCell2. Both BS1 and BS2 may be use a channel access technique for communication on SCell 2 to avoid interference.

Channel Access Using Long-Term Sensing and LBT Procedure

Figures 8A, 8B:
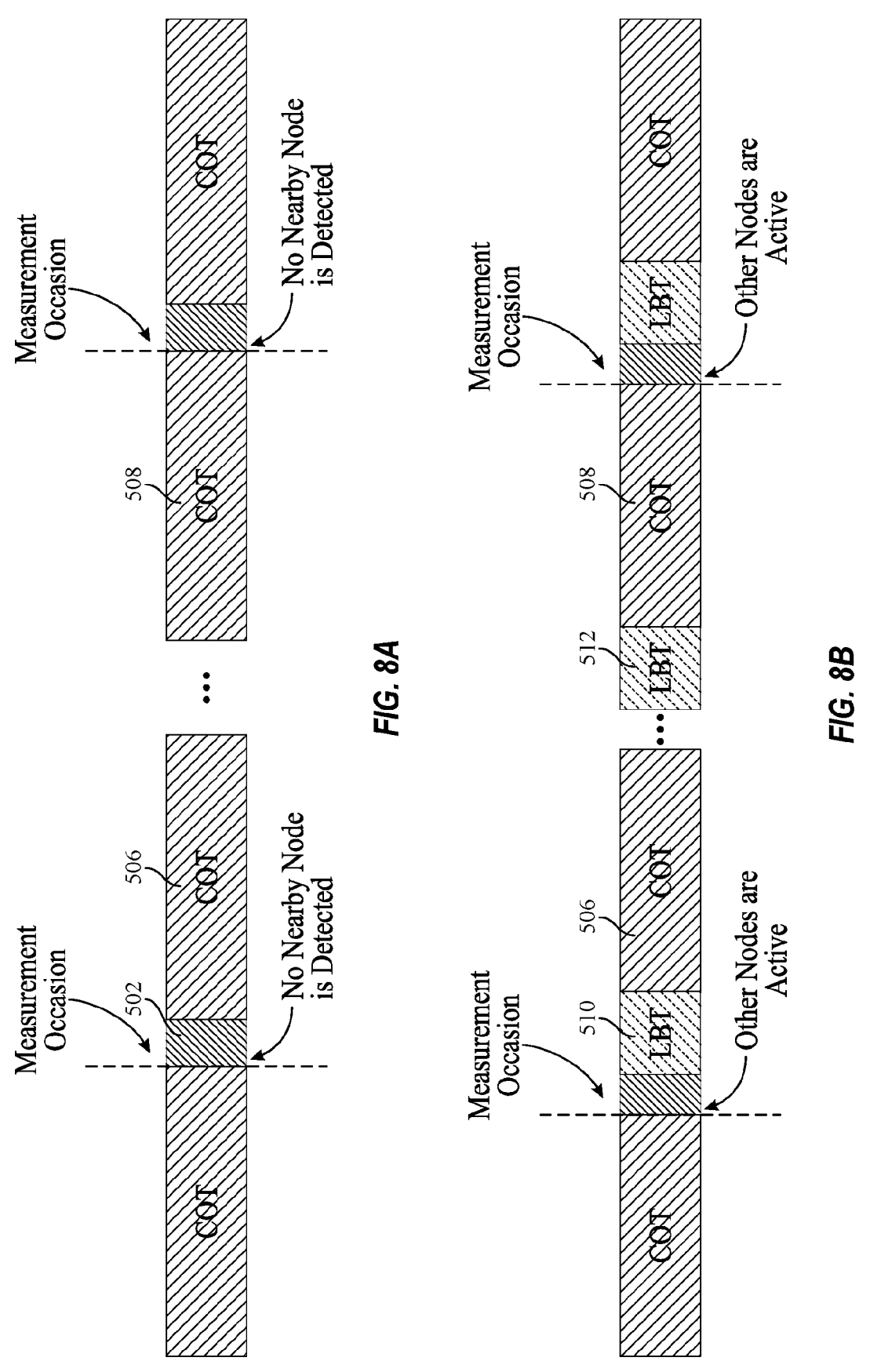
FIGS. 8A and 8B illustrate example channel access procedures using long-term sensing and another listen-before-talk procedure.

FIGS. 8A and 8B illustrate example channel access procedures using long-term sensing and an LBT procedure. As illustrated in FIG. 8A, the wireless node may perform channel measurement during measurement occasion 502, and if no nearby node is detected, the wireless node communicates on the PCell without additional restrictions. In other words, the wireless node may communicate on multiple COTs (e.g., COTs 506 and 508) after the measurement occasion 502, as shown. If, on the other hand, a nearby node is detected during the measurement occasion 502, the wireless node may perform an LBT procedure before each of the COTs, as illustrated in FIG. 8B. For example, the wireless node may perform a CAT 2 LBT procedure 510, 512 before each of COTs 506, 508 before communicating during the COT.

Referring back to FIG. 6, gaining access to the medium (e.g., at block 604 o) may include measuring energy of the medium during a measurement occasion for a long-term sensing procedure. Gaining access to the medium may further include measuring energy of the medium during a measurement occasion for a listen before talk procedure after the measurement occasion for the long-term sensing procedure, as described with respect to FIGS. 8A and 8B.

Channel Access Based on Single-TRP or Multi-TRP Communication

Figure 9A:
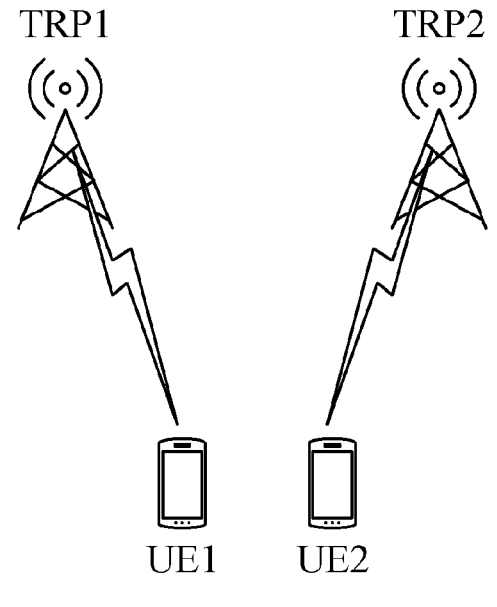
FIGS. 9A and 9B illustrate example techniques for selection of a channel access procedure based on whether a single-transmission-reception point or multiple TRPs is used for communication.
Figure 9B:
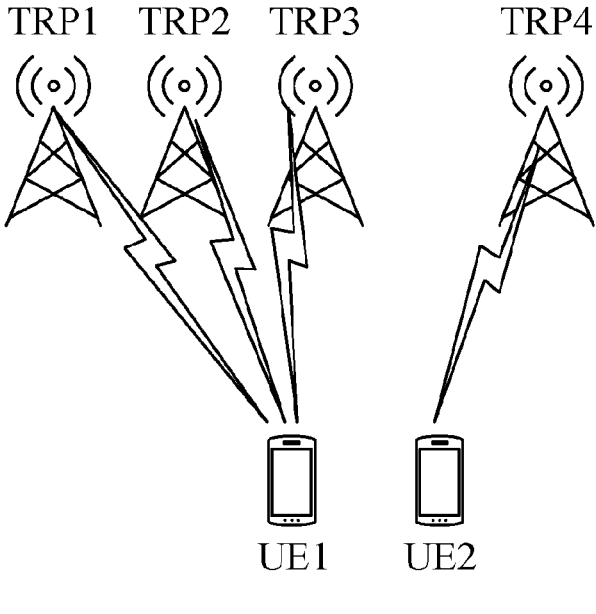

FIGS. 9A and 9B illustrate example techniques for the selection of a channel access procedure based on whether a single-TRP or multiple TRPs is used for communication with a UE. As illustrated in FIG. 9A, each of UE1 and UE2 may be in communication with a single-TRP such as TRP1 and TRP2, respectively.

FIG. 9B illustrates multi-TRP transmissions. For multi-TRP transmissions, more than one TRP may serve a single UE at a given time or frequency slot to improve performance. For example, TRP1, TRP2, and TRP3 may serve UE1, as shown. Using multiple TRP transmissions may result in an increase of interference to other nodes (e.g., UE2) near the desired UE (e.g., UE1) since the effect of interference is combined across the transmissions from the multiple TRP.

In some aspects, a BS using single-TRP transmission may perform a less stringent channel access procedure as compared to a BS using multiple TRP transmissions. For example, a BS performing single-TRP transmission may be exempt from performing a channel sensing procedure, whereas a BS performing simultaneous multi-TRP transmissions to the same UE may perform a channel sensing procedure. As another example, a BS performing single-TRP transmission may perform long-term sensing, whereas a BS performing simultaneous multi-TRP transmissions to the same UE may perform one of CAT1-4 LBT procedures.

Figure 10:
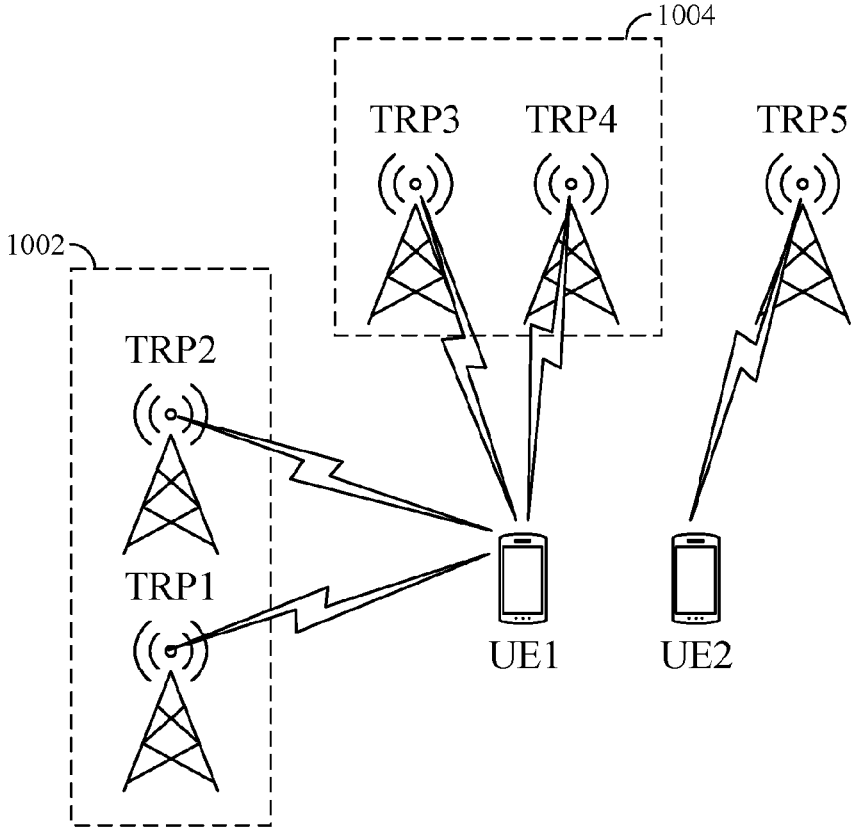
FIG. 10 illustrates grouping of transmission-reception points for performing a channel access procedure.

FIG. 10 illustrates grouping of TRPs for performing a channel access procedure. As illustrated, for multiple TRPs may be divided into sub-groups. For example, TRP1 and TRP2 may be in a first TRP group 1002 while TRP3 and TRP4 may be in a second TRP group 1004. In some aspects, a subset of TRPs within each group may perform a channel sensing procedure (e.g., one of CAT 1-4 LBT procedures or long-term sensing), while one or more other TRPs within the same group may be exempt from performing a channel sensing procedure.

For example, for TRP group 1002, only TRP1 (e.g., part of a first BS) may perform a channel sensing procedure and indicate the results to TRP2 (e.g., part of a second BS), allowing TRP1 and TRP2 to perform simultaneous multi-TRP transmissions to UE1. Similarly, TRP3 (e.g., part of a third BS) may perform a channel sensing procedure on behalf of the TRP group 1004, including both TRP3 and TRP4.

Example Wireless Communication Devices

Figure 11:
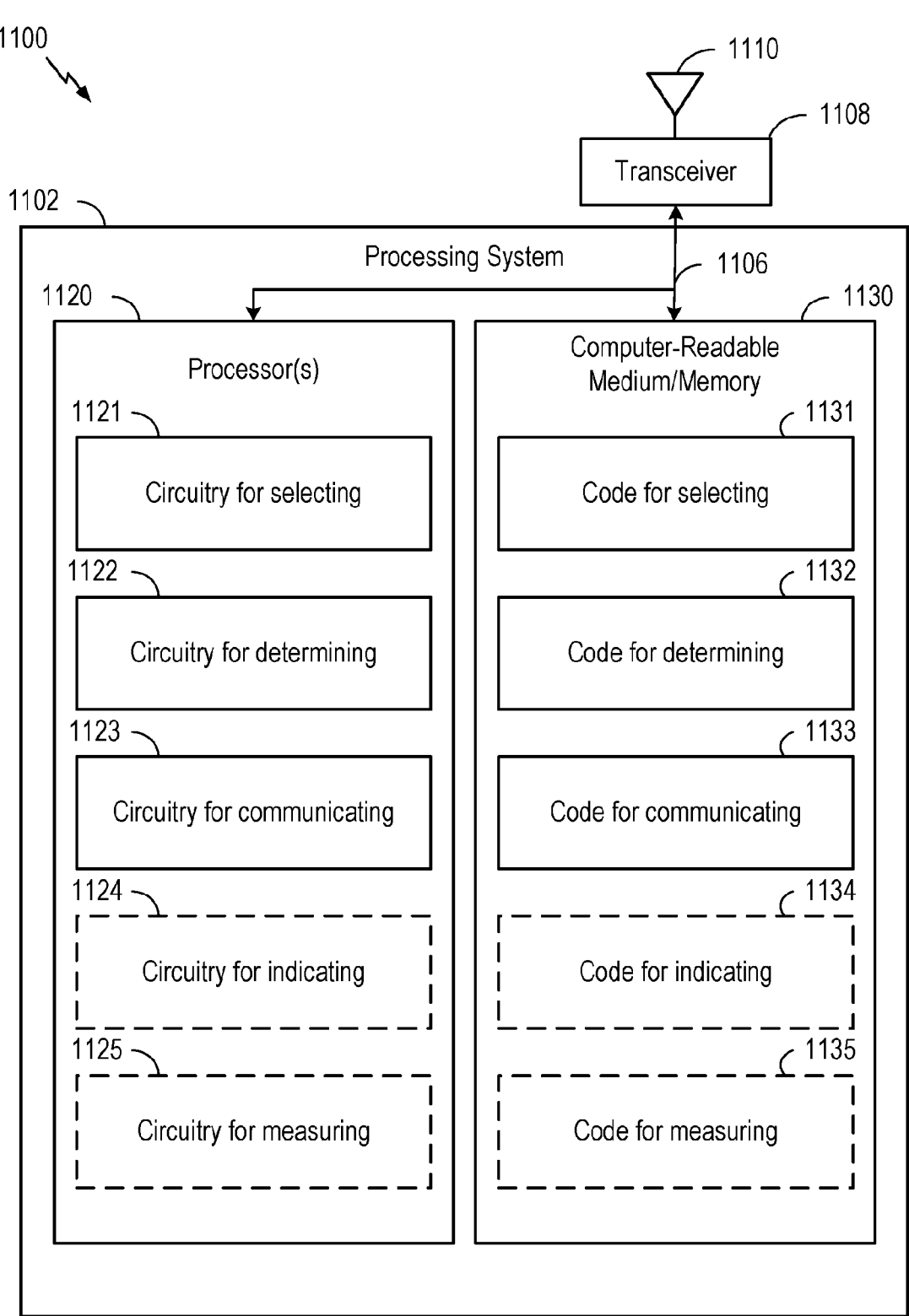
FIG. 11 depicts aspects of an example communications device.

FIG. 11 depicts an example communications device 1100 that includes various components operable, configured, or adapted to perform operations for the techniques disclosed herein, such as the operations depicted and described with respect to FIG. 6. In some examples, communication device 1100 may be a BS 102 or a UE 104 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIG. 6, or other operations for performing the various techniques discussed herein for channel access.

In the depicted example, computer-readable medium/memory 1130 stores code 1131 for selecting, code 1132 for determining, and code 1133 for communicating. The computer-readable medium/memory 1130 may optionally also store code 1134 for indicating and code 1135 for measuring.

In the depicted example, the one or more processors 1120 include circuitry configured to implement the code stored in the computer-readable medium/memory 1130, including circuitry 1121 for selecting, circuitry 1122 for determining, and circuitry 1123 for communicating. The one or more processors 1120 may also include circuitry 1124 for indicating and circuitry 1125 for measuring.

Various components of communications device 1100 may provide means for performing the methods described herein, including with respect to FIG. 6.

In some examples, means for transmitting or sending (or means for outputting for transmission) may include the transceivers 232 or 254 and/or antenna(s) 234 or 252 of the BS 102 or UE 104 illustrated in FIG. 2 and/or transceiver 1108 and antenna 1110 of the communication device 1100 in FIG. 11.

In some examples, means for receiving (or means for obtaining) may include the transceivers 232 or 254 and/or antenna(s) 234 or 252 of the BS or UE illustrated in FIG. 2 and/or transceiver 1108 and antenna 1110 of the communication device 1100 in FIG. 11.

In some examples, means for selecting, means for determining, means for communicating, means for indicating, and means for measuring may include various processing system components, such as: the one or more processors 1120 in FIG. 11, or aspects of the base station 102 depicted in FIG. 2, including receive processor 238 or 258, transmit processor 220 or 264, TX MIMO processor 230 or 266, and/or controller/processor 240 or 280 (including channel access component 241 or 281).

Notably, FIG. 11 is just use example, and many other examples and configurations of communication device 1100 are possible.

Example Clauses

Implementation examples are described in the following numbered clauses:

Clause 1. A method for wireless communication by a wireless node, comprising: selecting a mode of operation associated with a configuration for communicating with one or more other wireless nodes; determining a procedure for gaining access to a medium to be used for the communication, wherein the procedure is determined based on the mode of operation; and communicating with the one or more other wireless nodes using the mode of operation after gaining access to the medium based on the procedure.

Clause 2. The method of claim 1, wherein determining the procedure for gaining access to the medium comprises determining whether to perform a listen before talk procedure.

Clause 3. The method of claim 1, wherein determining the procedure comprises selecting between a listen before talk procedure and a long-term sensing procedure.

Clause 4. The method of claim 1, wherein selecting the mode of operation comprises selecting a cell associated with the communication, wherein the procedure is determined based on the cell.

Clause 5. The method of claim 4, wherein selecting the cell associated with the communication comprises selecting one of a primary cell and a secondary cell.

Clause 6. The method of claim 4, wherein selecting the cell associated with the communication comprises selecting one of a primary secondary cell and a secondary cell.

Clause 7. The method of claim 1, wherein determining the procedure comprises determining to use a more stringent channel access procedure for communicating on a secondary cell as compared to communicating on a primary cell or a primary secondary cell.

Clause 8. The method of claim 1, wherein selecting the mode of operation comprises selecting whether the communication uses single-transmission-reception point or multi-transmission-reception point communication with a user-equipment.

Clause 9. The method of claim 8, wherein determining the procedure comprises determining to use a more stringent channel access procedure for communicating using the multi-transmission-reception point communication as compared to using the single-transmission-reception point communication.

Clause 10. The method of claim 1, wherein: the wireless node comprises a transmission-reception point that is part of a group of transmission-reception points used for multi-transmission-reception point communication with a user-equipment, and the method further comprises indicating results of the procedure to one or more other transmission-reception points in the group.

Clause 11. The method of claim 1, wherein: the wireless node comprises a transmission-reception point that is part of a group of transmission-reception points used for multi-transmission-reception point communication with a user-equipment, and the method further comprises receiving an indication of results of the procedure from one or more other transmission-reception points in the group.

Clause 12. The method of claim 1, wherein gaining access to the medium comprises measuring energy of the medium during a measurement occasion for a long-term sensing procedure.

Clause 13. The method of claim 12, wherein gaining access to the medium further comprises measuring energy of the medium during a measurement occasion for a listen before talk procedure after the measurement occasion for the long-term sensing procedure.

Clause 14. The method of claim 13, wherein the listen before talk procedure is performed in response to detection of a nearby node using the long-term sensing procedure.

Clause 15: An apparatus, comprising: a memory comprising executable instructions; one or more processors configured to execute the executable instructions and cause the apparatus to perform a method in accordance with any one of Clauses 1-14.

Clause 16: An apparatus, comprising means for performing a method in accordance with any one of Clauses 1-14.

Clause 17: A non-transitory computer-readable medium comprising executable instructions that, when executed by one or more processors of an apparatus, cause the apparatus to perform a method in accordance with any one of Clauses 1-14.

Clause 18: A computer program product embodied on a computer-readable storage medium comprising code for performing a method in accordance with any one of Clauses 1-14.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2p slots/subframe. The subcarrier spacing and symbol length/duration are a function of the numerology. The subcarrier spacing may be equal to $2^1 \times 15$ kHz, where is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of channel access in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a wireless node, comprising:
   selecting a mode of operation associated with a configuration for communicating with one or more other wireless nodes;

determining a procedure for gaining access to a medium to be used for the communication, wherein the procedure is determined based on the mode of operation; and communicating with the one or more other wireless nodes using the mode of operation after gaining access to the medium based on the procedure, wherein determining the procedure comprises determining to use a more stringent channel access procedure for communicating:

(i) on a secondary cell as compared to communicating on a primary cell or a primary secondary cell; or (ii) using a multi-transmission-reception point communication as compared to using a single-transmission-reception point communication, wherein selecting the mode of operation comprises selecting whether the communication uses the single-transmission-reception point or the multi-transmission-reception point communication with a user-equipment.

2. The method of claim 1, wherein selecting the mode of operation comprises selecting a cell associated with the communication, wherein the procedure is determined based on the cell.

3. The method of claim 2, wherein selecting the cell associated with the communication comprises selecting one of the primary cell and the secondary cell.

4. The method of claim 2, wherein selecting the cell associated with the communication comprises selecting one of the primary secondary cell and the secondary cell.

5. The method of claim 1, wherein determining the procedure comprises determining to use the more stringent channel access procedure for communicating on the secondary cell as compared to communicating on the primary cell or the primary secondary cell.

6. The method of claim 1, wherein selecting the mode of operation comprises selecting whether the communication uses the single-transmission-reception point or the multi-transmission-reception point communication with the user-equipment, and wherein determining the procedure comprises determining to use the more stringent channel access procedure for communicating using the multi-transmission-reception point communication as compared to using the single-transmission-reception point communication.

7. The method of claim 1, wherein:

the wireless node comprises a transmission-reception point that is part of a group of transmission-reception points used for multi-transmission-reception point communication with a user-equipment, and the method further comprises indicating results of the procedure to one or more other transmission-reception points in the group.

8. The method of claim 1, wherein:

the wireless node comprises a transmission-reception point that is part of a group of transmission-reception points used for multi-transmission-reception point communication with a user-equipment, and the method further comprises receiving an indication of results of the procedure from one or more other transmission-reception points in the group.

9. The method of claim 1, wherein gaining access to the medium comprises measuring energy of the medium during a measurement occasion for a long-term sensing procedure.

10. The method of claim 9, wherein gaining access to the medium further comprises measuring energy of the medium during a measurement occasion for a listen before talk procedure after the measurement occasion for the long-term sensing procedure.

11. The method of claim 10, wherein the listen before talk procedure is performed in response to detection of a nearby node using the long-term sensing procedure.

12. An apparatus for wireless communication, comprising:

one or more memories a memory having executable instructions; and one or more processors, coupled to the one or more memories, and configured to cause the apparatus to:

select a mode of operation associated with a configuration for communicating with one or more wireless nodes;

determine a procedure for gaining access to a medium to be used for the communication, wherein the procedure is determined based on the mode of operation; and communicate with the one or more wireless nodes using the mode of operation after gaining access to the medium based on the procedure, wherein to cause the apparatus to determine the procedure, the one or more processors are configured to cause the apparatus to determine to use a more stringent channel access procedure for communicating:

(i) on a secondary cell as compared to communicating on a primary cell or a primary secondary cell; or (ii) using a multi-transmission-reception point communication as compared to using a single-transmission-reception point communication, wherein to cause the apparatus to select the mode of operation, the one or more processors are configured to cause the apparatus to select whether the communication uses the single-transmission-reception point or the multi-transmission-reception point communication with a user-equipment.

13. The apparatus of claim 12, wherein to cause the apparatus to select the mode of operation, the one or more processors are configured to cause the apparatus to select a cell associated with the communication, wherein the procedure is determined based on the cell.

14. The apparatus of claim 13, wherein to cause the apparatus to select the cell associated with the communication, the one or more processors are configured to cause the apparatus to select one of the primary cell and the secondary cell.

15. The apparatus of claim 13, wherein to cause the apparatus to select the cell associated with the communication, the one or more processors are configured to cause the apparatus to select one of the primary secondary cell and the secondary cell.

16. The apparatus of claim 12, wherein to cause the apparatus to determine the procedure, the one or more processors are configured to cause the apparatus to determine to use the more stringent channel access procedure for communicating on the secondary cell as compared to communicating on the primary cell or a primary secondary cell.

17. The apparatus of claim 12, wherein to cause the apparatus to select the mode of operation, the one or more processors are configured to cause the apparatus to select whether the communication uses the single-transmission-reception point or the multi-transmission-reception point communication with the user-equipment, wherein to cause the apparatus to determine the procedure, the one or more processors are configured to cause the apparatus to determine to use the more stringent channel access procedure for communicating using the multi-transmission-reception point communication as compared to using the single-transmission-reception point communication.

18. The apparatus of claim 12, wherein:

the apparatus comprises a transmission-reception point that is part of a group of transmission-reception points used for multi-transmission-reception point communication with a user-equipment, and the one or more processors are configured to cause the apparatus to indicate results of the procedure to one or more other transmission-reception points in the group.

19. The apparatus of claim 12, wherein:

the apparatus comprises a transmission-reception point that is part of a group of transmission-reception points used for multi-transmission-reception point communication with a user-equipment, and the one or more processors are configured to cause the apparatus to receive an indication of results of the procedure from one or more other transmission-reception points in the group.

20. The apparatus of claim 12, wherein the one or more processors are configured to cause the apparatus to gain access to the medium by measuring energy of the medium during a measurement occasion for a long-term sensing procedure.

21. The apparatus of claim 20, wherein to cause the apparatus to gain access to the medium, the one or more processors are configured to cause the apparatus to measure energy of the medium during a measurement occasion for a listen before talk procedure after the measurement occasion for the long-term sensing procedure.

22. The apparatus of claim 21, wherein the listen before talk procedure is in response to detection of a nearby node using the long-term sensing procedure.

* * * * *